United States Patent
Shimanuki (10) Patent No.: US 7,367,521 B2
(45) Date of Patent: May 6, 2008

(54) STORAGE MEDIUM LEADER MECHANISM, A STORAGE MEDIUM LEADER APPARATUS, A WEB STORAGE DEVICE, AND A METHOD OF FORMING A STORAGE MEDIUM LEADER MECHANISM

(75) Inventor: Hiroyuki Shimanuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/418,073

(22) Filed: May 5, 2006

(65) Prior Publication Data

US 2007/0176037 A1   Aug. 2, 2007

(30) Foreign Application Priority Data

May 12, 2005   (JP) ............................. 2005-139658

(51) Int. Cl.
*G11B 15/66* (2006.01)

(52) U.S. Cl. ................ 242/332.4; 242/332.7; 242/532.1; 242/532.7

(58) Field of Classification Search ................ 242/332, 242/332.4, 332.7, 332.8, 532.1, 532.6, 532.7, 242/582; 360/95, 132
See application file for complete search history.

(56) References Cited

U.S. PATENT DOCUMENTS

| | | | |
|---|---|---|---|
| 6,378,796 B1 * | 4/2002 | Hamming et al. | 242/332.4 |
| 6,626,387 B1 * | 9/2003 | Hamming | 242/332.4 |
| 6,889,928 B2 * | 5/2005 | Tsuchiya | 242/332.4 |
| 7,063,286 B2 * | 6/2006 | Masuda | 242/332.4 |
| 7,195,190 B2 * | 3/2007 | Tsuneyoshi et al. | 242/332.4 |
| 2004/0004142 A1 * | 1/2004 | Gavit et al. | 242/332.4 |
| 2004/0099757 A1 * | 5/2004 | Masuda | 242/332.4 |
| 2004/0129816 A1 * | 7/2004 | Hamming | 242/332.4 |
| 2004/0144878 A1 * | 7/2004 | Tsuchiya | 242/332.4 |
| 2004/0169101 A1 * | 9/2004 | Hoelsaeter et al. | 242/332.4 |

FOREIGN PATENT DOCUMENTS

JP   2001-135003   5/2001

* cited by examiner

*Primary Examiner*—William A Rivera
(74) *Attorney, Agent, or Firm*—McGinn IP Law Group, PLLC (57) ABSTRACT

A storage medium leader mechanism for threading a film of a storage medium on a machine reel in a storage medium apparatus along a guide includes a rotational shaft and a leader block. The leader block includes a first contact unit that is contactable with the guide that guides the leader block, and a second contact unit that is contactable with the guide. The first and second contact units are co-planar, a co-planarity of the first and second contact units being substantially perpendicular to a rotation axis of the rotational shaft.

18 Claims, 10 Drawing Sheets

FIG. 5C CROSS SECTION AA

FIG. 5D CROSS SECTION BB

STORAGE MEDIUM LEADER MECHANISM, A STORAGE MEDIUM LEADER APPARATUS, A WEB STORAGE DEVICE, AND A METHOD OF FORMING A STORAGE MEDIUM LEADER MECHANISM

BACKGROUND OF THE INVENTION

The present invention relates to a storage medium leader mechanism (e.g., a leader mechanism for threading a wound film medium, e.g., magnetic tape, a web, etc.).

For example, this invention relates to a magnetic tape device for extracting a leader pin attached to one end of a magnetic tape stored in a tape cartridge from within that cartridge, moving the leader pin along a specified guide path and threading the magnetic tape on a reel within the device.

A conventional magnetic tape device contains a leader block with a hook for engaging and holding a leader pin attached to the tip of the magnetic tape stored within the tape cartridge, as disclosed for example in JP-A No. 135003/2001.

The leader block is axially supported for free movement on the tip of the threading arm. The threading arm is axially supported for free movement on the threader drive arm driven by a drive device.

In order to thread the magnetic tape from the tape cartridge loaded in the magnetic tape device, onto the machine reel in the magnetic tape device, a hook on the leader block picks up the tape. That is, first of all, the leader block engages with and holds the leader pin installed on the tip of the magnetic tape. The leader block holding the magnetic tape is then guided from the tape cartridge by the swinging of the threading arm into the center section of the machine reel.

The leader block at this time moves along a specified guide path so that the magnetic tape of the tape cartridge is guided past the front edge of the magnetic head to the center section of the machine reel. The leader block therefore slides along the guide formed on the specified guide path.

Figure 6:
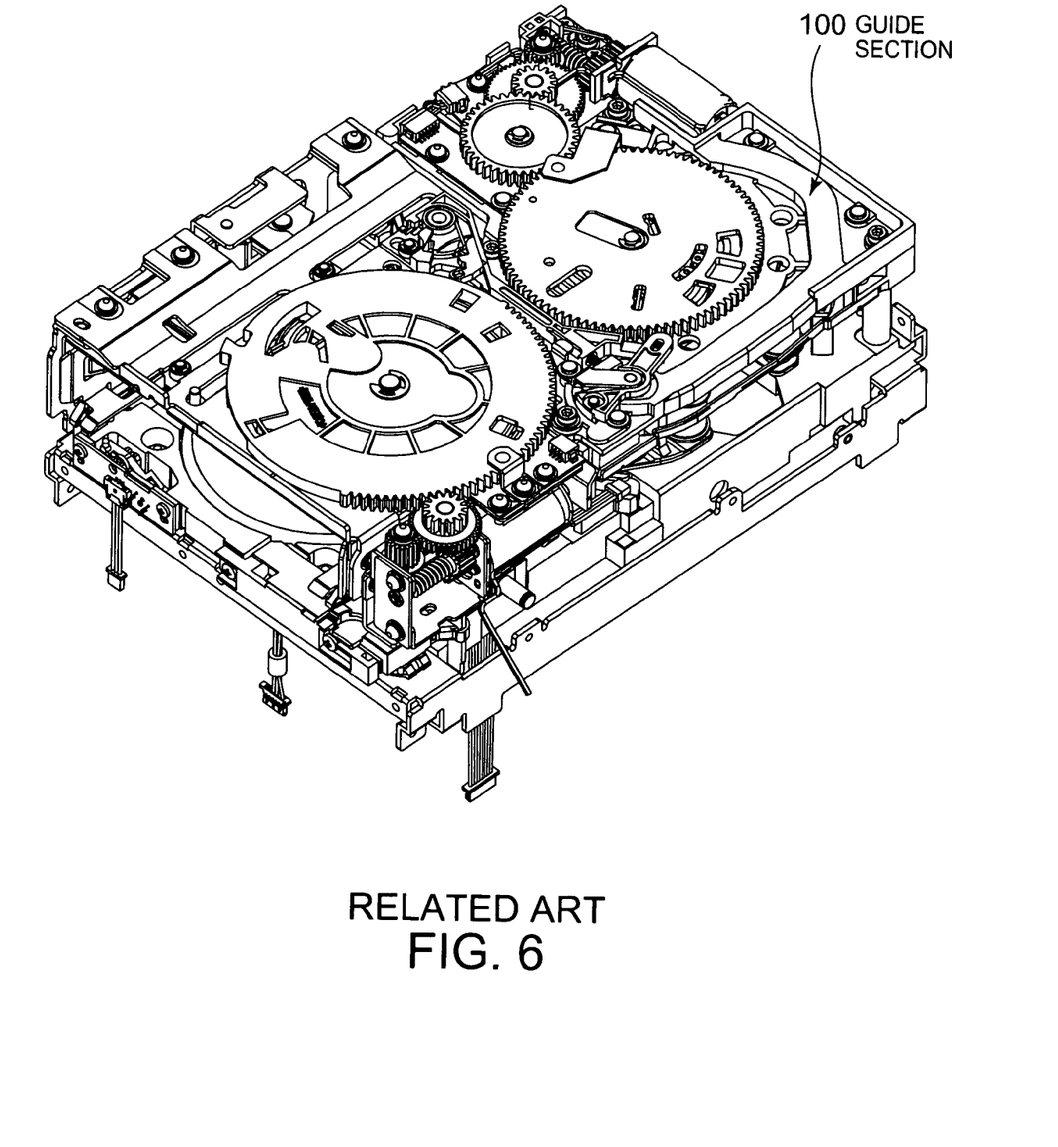
FIG. 6 shows a perspective view showing one example of the magnetic tape device of the related art.
Figure 7:
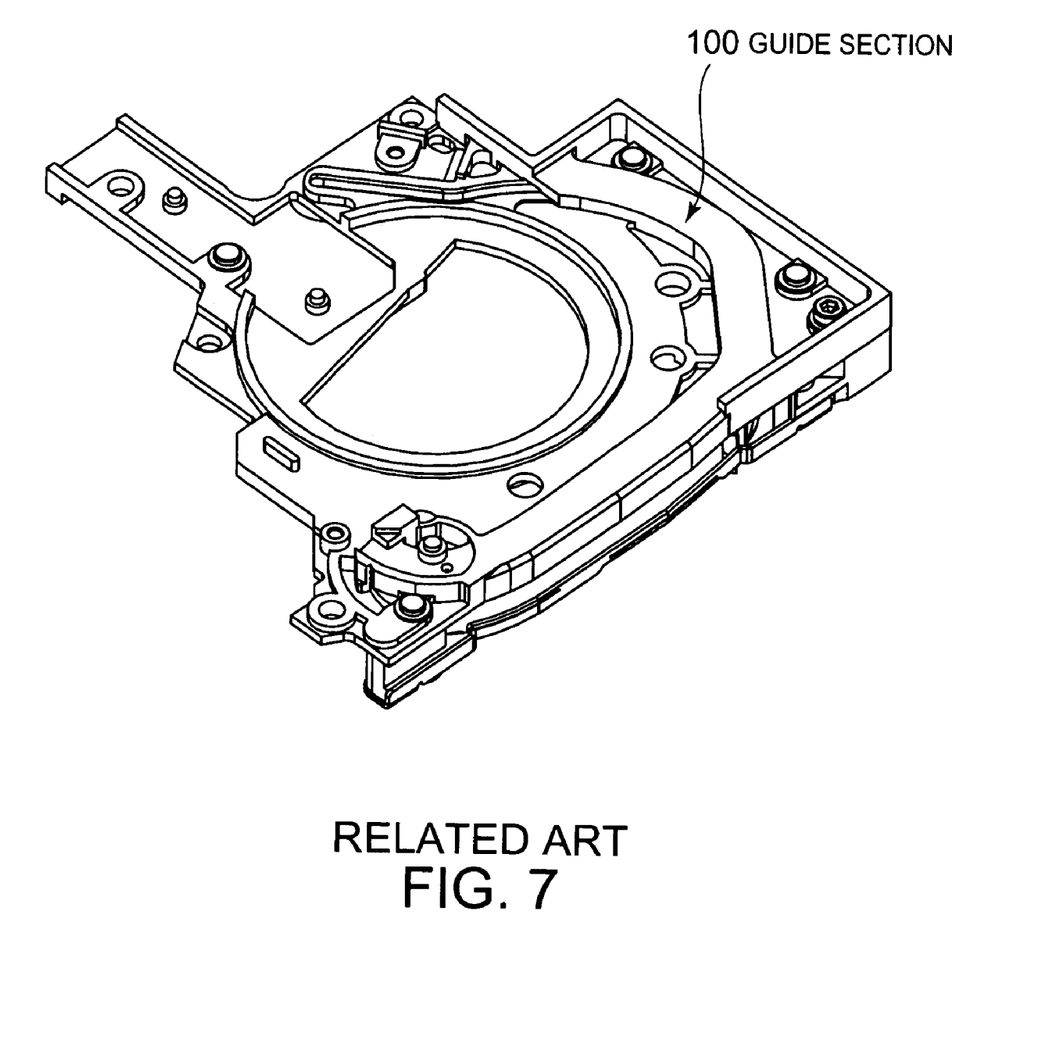
FIG. 7 shows a perspective view as seen from the upper side of just the guide section for guiding the leader block in the device of FIG. 6.
Figure 8A:
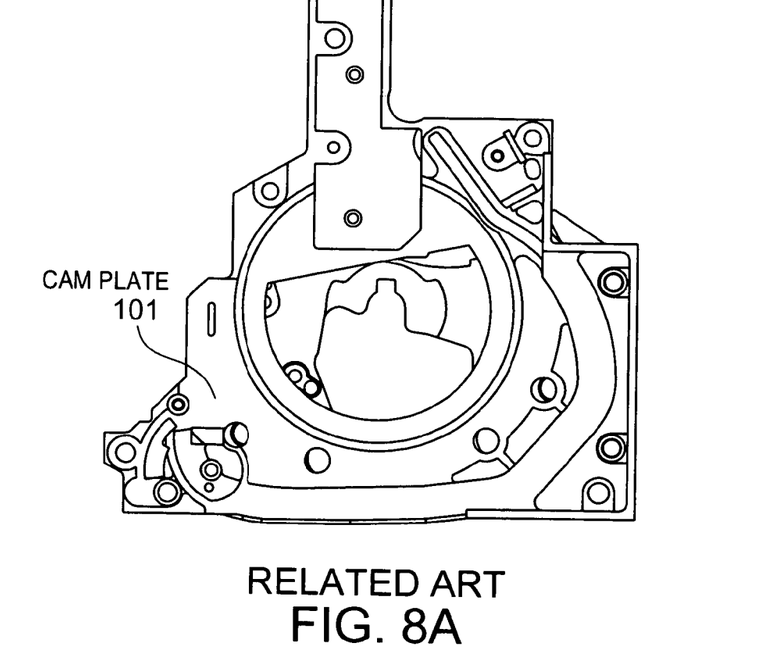
FIG. 8A shows an upper view of the guide section shown in FIG. 7.
Figure 8B:
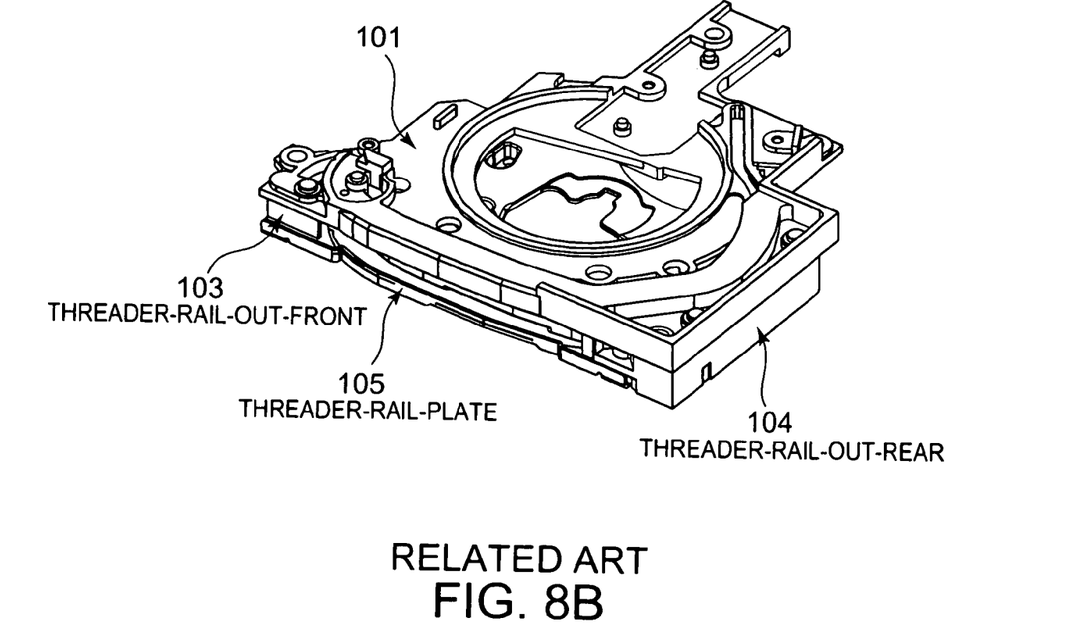
FIG. 8B shows a perspective view as seen from that upper side.
Figure 9A:
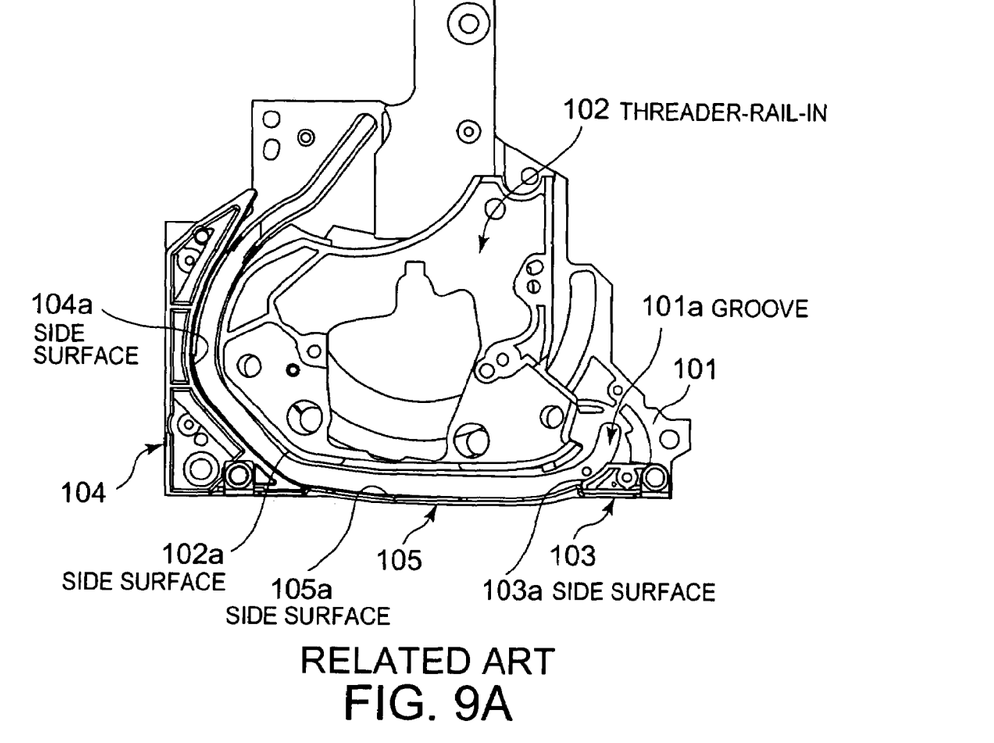
FIG. 9A shows a bottom view of the guide section shown in FIG. 7.
Figure 9B:
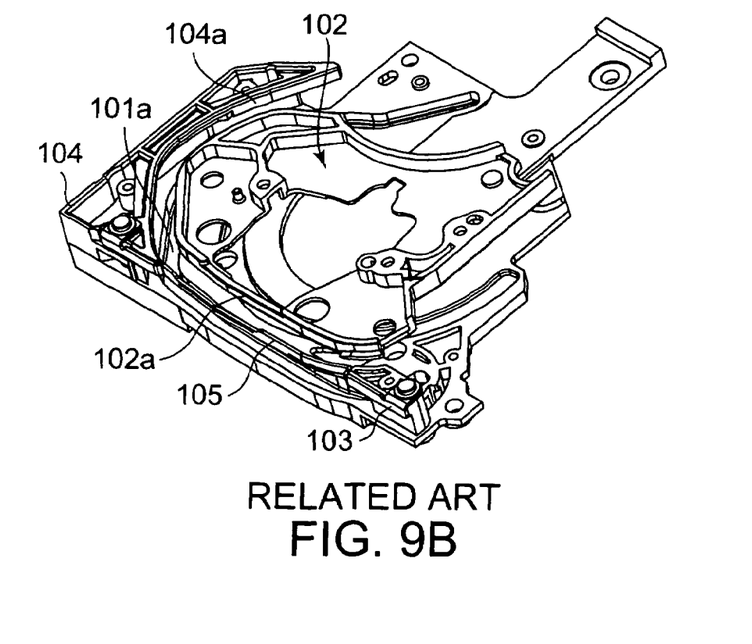
FIG. 9B shows a perspective view as seen from that lower side.
Figure 10A:
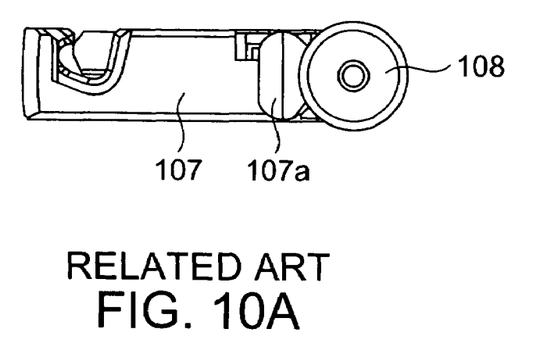
FIG. 10A shows an upper view.
Figure 10B:
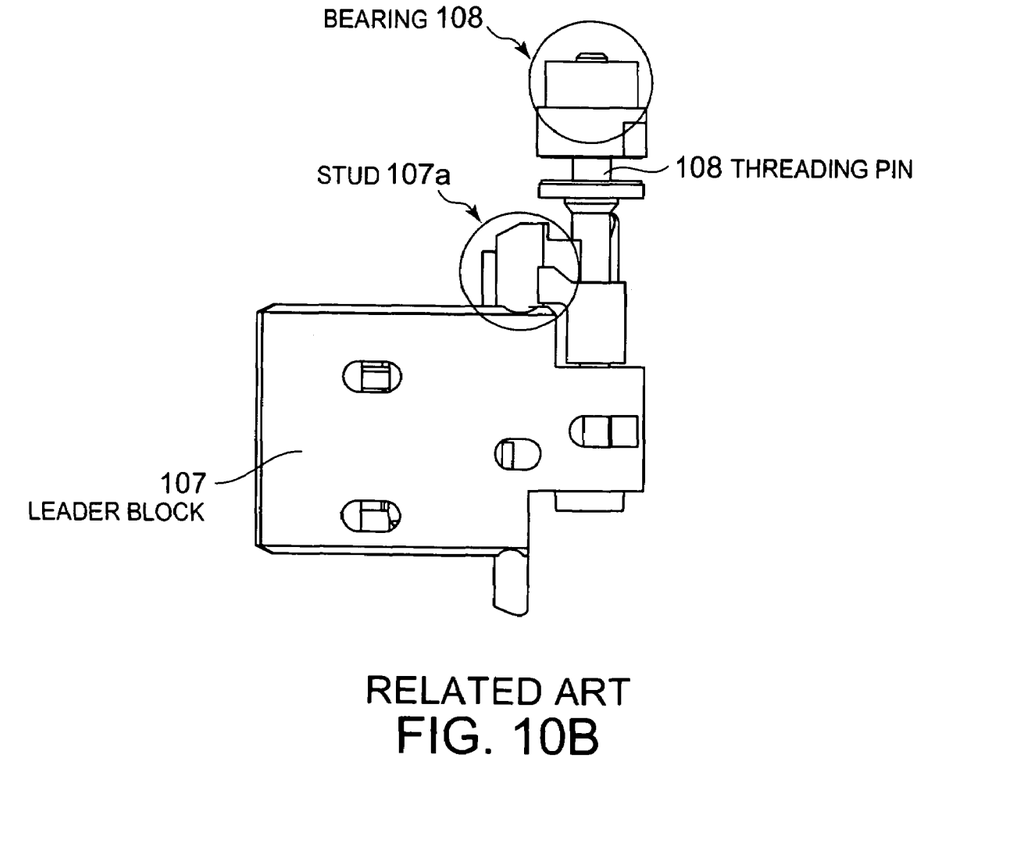
FIG. 10B shows a front view of the leader block guided by the guide section shown in FIG. 6 through FIGS. 9A and 9B.

The guide section or the leader block of the conventional magnetic tape device is described next while referring to the drawings. FIG. 6 shows a perspective view showing one example of the magnetic tape device of the related art, FIG. 7 shows a perspective view as seen from the upper side of just the guide section for guiding the leader block in the device of FIG. 6, FIG. 8A shows an upper view of the guide section shown in FIG. 7, FIG. 8B shows a perspective view as seen from that upper side, FIG. 9A shows a bottom view of the guide section shown in FIG. 7, FIG. 9B shows a perspective view as seen from that lower side, FIG. 10A shows an upper view, and FIG. 10B shows a frontal view of the leader block guided by the guide section shown in FIG. 6 through FIG. 8B. Though FIG. 6 can be found in JP-A No. 004521/2006 (but is not prior art against the claims of the present application since it was published after the underlying priority document (i.e., JPA No. 2005-139658) of the present application was filed), FIGS. 7-9 are not published outside of the assignee's company.

The conventional magnetic tape device contains guide section 100, as shown in FIG. 6 and FIG. 7. Guide section 100 includes a first guide for guiding the leader block from the magnetic tape entrance/exit of the tape cartridge loaded within the device, to the center section of the machine reel; and a second guide for restricting how the leader block faces when guiding the leader block.

The first guide is made from groove 101a (FIG. 9A) formed on the rear side of cam plate 101 as shown in FIG. 8A-FIG. 9B.

Threader-rail-in 102 is installed on one side of groove 101a on the rear side of cam plate 101. Threader-rail-out-front 103, threader-rail-out-rear 104, and threader-rail-plate 105 are installed on the other side. A second guide (called a "threader rail") is formed by side surface 102a of threader-rail-in 102, and side surface 105a of threader-rail-plate 105 and side surface 104a of threader-rail-out-rear 104, and side surface 103a of threader-rail-out-front 103 facing side surface 102a across a gap. In other words, the second guide is formed along the first guide at a position whose height is changed with respect to the first guide.

The threading pin is first clamped to the tip of the threading arm as was described above referring to JP-A No. 135003/2001. The edge of leader block 107 is axially supported on the bottom edge of threading pin 106 for free movement, as shown in FIG. 10A and FIG. 10B. Bearing 108 is inserted into the upper edge of threading pin 106. Bearing 108 is inserted into and guided by groove 101a functioning as the first guide and formed on the rear side of cam plate 101.

Leader block 107 rotates freely with respect to the threading arm in the state where the bearing on the upper edge of threading pin 106 is inserted just into groove 101a and so the positioning of leader block 107 (how it faces) is unstable when being guided.

Stud 107a for making sliding contact with a second guide (side surfaces 102a through 105a) is therefore formed on the upper side of leader block 107. Thus, the direction that leader block 107 faces is restricted during the guiding.

SUMMARY OF THE INVENTION

Two guides including a first guide and a second guide therefore prepared in the conventional magnetic device described above, to guide the leader block and stabilize the leader block in the direction that the leader block faces. The second guide in particular, is formed along the first guide, at a position whose height is different from the first guide. The guide section forming the first guide and the second guide therefore occupies a large position (space) in the device thickness direction (height). Thus, making the magnetic tape device thinner was difficult.

In view of the foregoing and other exemplary problems, drawbacks, and disadvantages of the conventional techniques, it is an exemplary feature of the present invention to provide a storage medium leader mechanism, a storage medium leader apparatus, a web storage device, and a method of forming a storage medium leader mechanism. For example, the present invention may allow making the device thinner while maintaining the functions of guiding the leader block, and stabilizing the direction that the leader block faces during guiding.

The present invention provides a storage medium leader mechanism for threading a film of a storage medium on a machine reel in a storage medium apparatus along a guide, including a rotational shaft, a leader block that picks up the film, the leader block being rotatably connected with the rotational shaft, wherein the leader block includes a first contact unit that is contactable with the guide that guides the leader block, and a second contact unit that is contactable with the guide, wherein the first and second contact units are co-planar, a co-planarity of the first and second contact units being substantially perpendicular to a rotation axis of the rotational shaft.

The present invention also provides a storage medium leader apparatus, including the storage medium leader mechanism in claim 1, and the guide guiding the leader block, the guide being a single guide.

The present invention also provides a storage medium leader mechanism for threading a film of a storage medium on a machine reel in a storage medium apparatus along a guide, including means for picking up the film, and means for rotating the means for picking up means, the picking up means being rotatably connected with the rotating means, wherein the picking up means includes first means for contacting a single guide that guides the picking up means, and second means for contacting the single guide, wherein the first and second contacting means are co-planar, a co-planarity of the first and second contacting means being substantially perpendicular to a rotation axis of the rotating means.

The present invention also provides a method of forming a storage medium leader mechanism for threading a film of a storage medium on a machine reel in a storage medium apparatus along a guide, including providing a rotational shaft, providing a leader block that picks up the film, the leader block being rotatably connected with the rotational shaft, providing a first contact unit that is contactable with said guide that guides the leader block, and providing a second contact unit that is contactable with said guide with the leader block, the first and second contact units being co-planar, a co-planarity of the first and second contact units being substantially perpendicular to a rotation axis of the rotational shaft.

The present invention also provides a web storage device, including a rotational shaft, a leader block that picks up the web, the leader block being rotatably connected with the rotational shaft, and a single guide that guides the leader block, wherein the leader block includes a first contact unit that is contactable with the guide that guides the leader block, and a second contact unit that contactable with the guide.

Therefore in this invention, for example, by installing a first contact unit (e.g., bearing) where the threading pin is inserted, and a second contact unit (e.g., stud) formed on the leader block rotating freely with respect to the rotational shaft (e.g., threading pin), both of the bearing and a stud are co-planar (e.g., at the same height), the exemplary functions of guiding the leader block to the machine reel, and restricting the direction that the leader block faces during guiding may be achieved by providing just one slot. The magnetic tape device may consequently be made thinner along its height (thickness) direction.

[Exemplary Advantage of the Invention]

For example, this invention may allow making the magnetic tape device thinner, while maintaining the functions of guiding the leader block from the tape cartridge to the machine reel, and stabilizing the direction the leader block faces during guiding to allow making the magnetic tape device thinner.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

DETAILED DESCRIPTION OF THE EXEMPLARY EMBODIMENTS

Hereinbelow, the modes of this invention are described while referring to the drawings. This invention relates to a storage medium leader mechanism for threading a wound film medium (e.g., magnetic tape, a web, etc.). For example, this invention relates to a magnetic tape device including a leader block that is guided by a guide section.

Hereinbelow a magnetic tape device will be described as one example of a storage medium leader mechanism for threading a wound film medium (e.g., magnetic tape, a web etc.). The following description of this invention mainly describes points differing from the leader block and guide section of the conventional structure.

Figure 1:
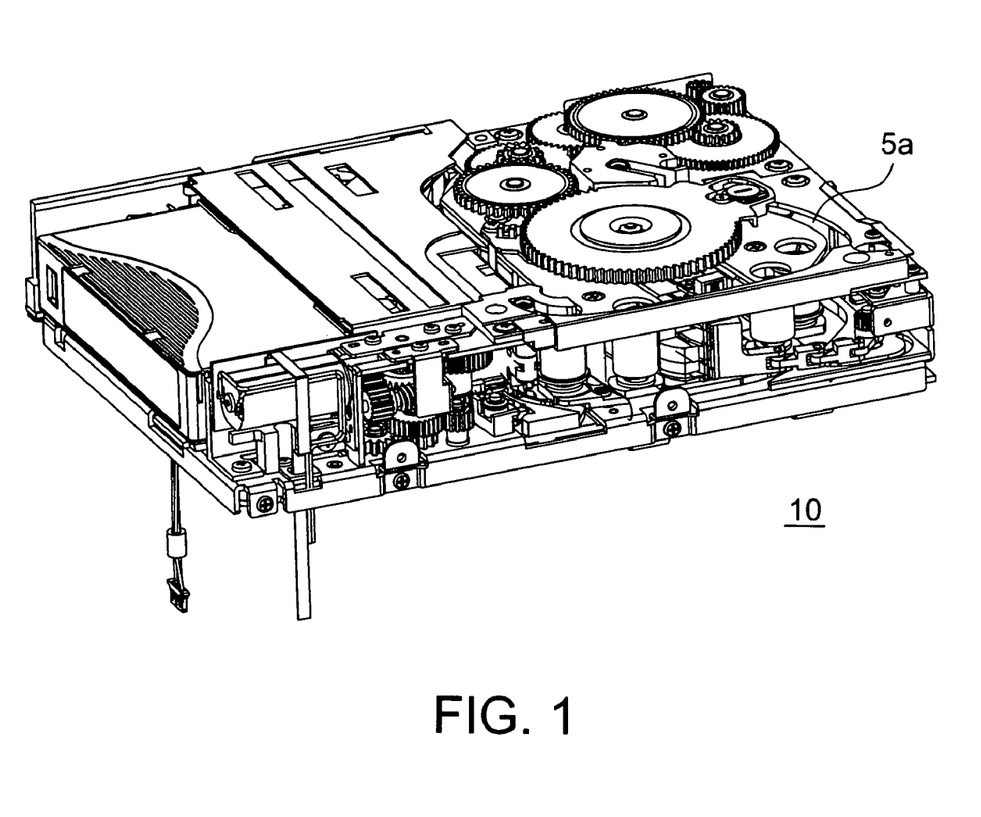
FIG. 1 shows an exemplary perspective view from an upper side of an exemplary magnetic tape device 10 of an exemplary embodiment of this invention.
Figure 2:
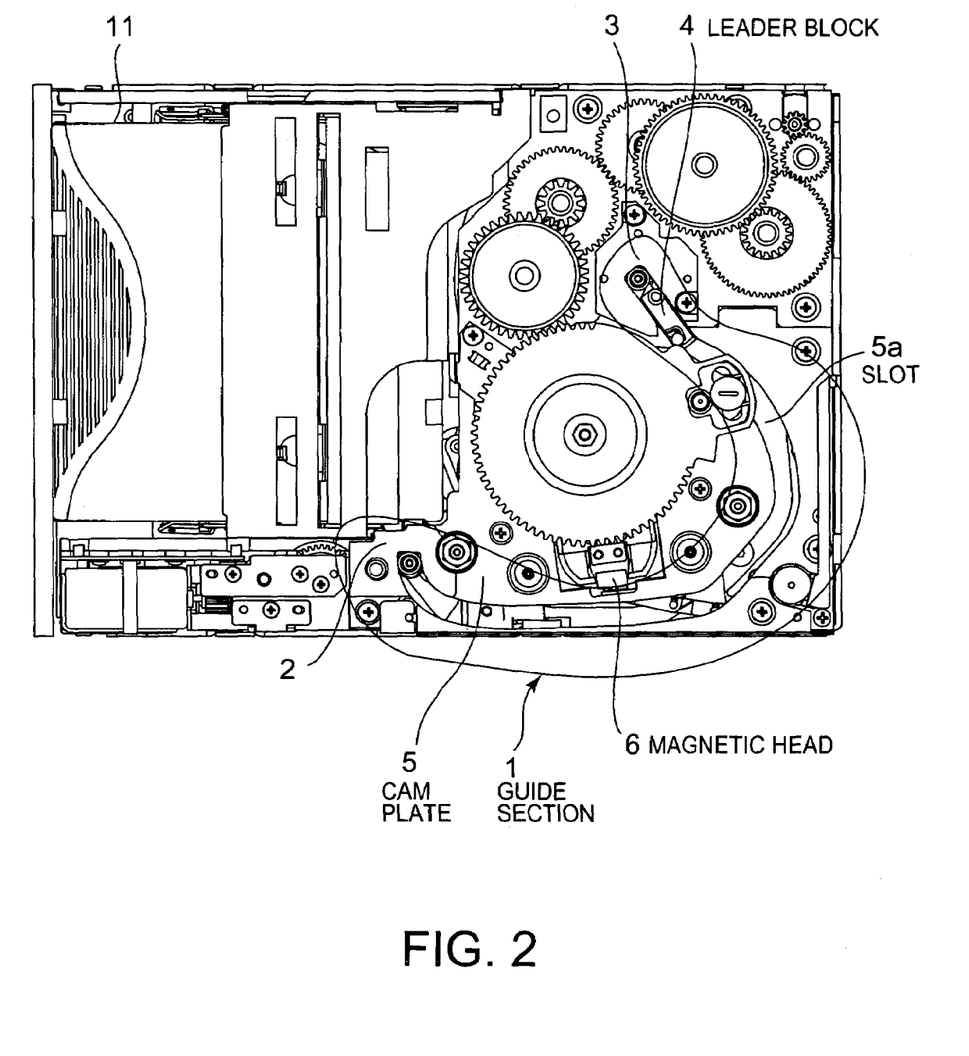
FIG. 2 shows an exemplary upper view showing an exemplary guide section for guiding an exemplary leader block in the exemplary magnetic tape device 10 shown in FIG. 1.
Figure 3A:
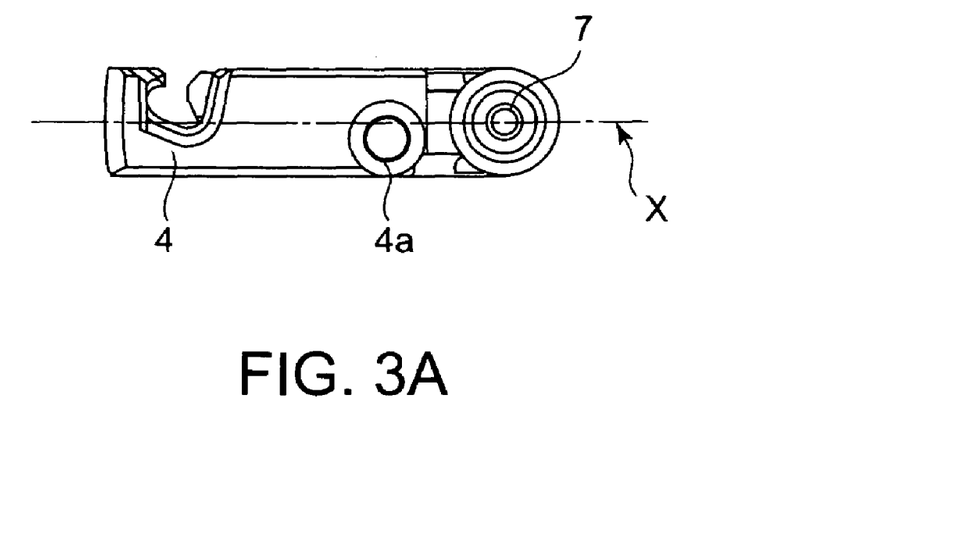
FIG. 3A shows an exemplary upper view of the exemplary leader block shown in FIG. 2.

FIG. 1 shows an exemplary perspective view from the upper side of the exemplary magnetic tape device 10 of the exemplary embodiment of this invention. FIG. 2 shows an exemplary upper view showing the exemplary guide section for guiding the exemplary leader block in the exemplary magnetic tape device 10 shown in FIG. 1. FIG. 3A shows an exemplary top view of the exemplary leader block shown in FIG. 2.

The exemplary magnetic tape device 10 for the exemplary embodiment shown in FIG. 1 includes guide section 1 shown enclosed by lines in FIG. 2. For example, guide section 1 may include both a function for guiding leader block 4 from the vicinity of tape entrance/exit 2 of storage medium 11 (e.g., tape cartridge) loaded within the device to center section 3 of the machine reel, and a function for restricting the direction that the leader block 4 faces during guiding of leader block 4.

Guide section 1 is formed by single guide 5a (e.g., slot 5a) formed in cam plate 5, for example. Slot 5a forms a guide path for guiding leader block 4 from the vicinity of tape entrance/exit 2 of storage medium 11 (e.g., tape cartridge) loaded within the device, along the read/write surface of magnetic head 6, to center section 3 of the machine reel, for example.

Figure 3B:
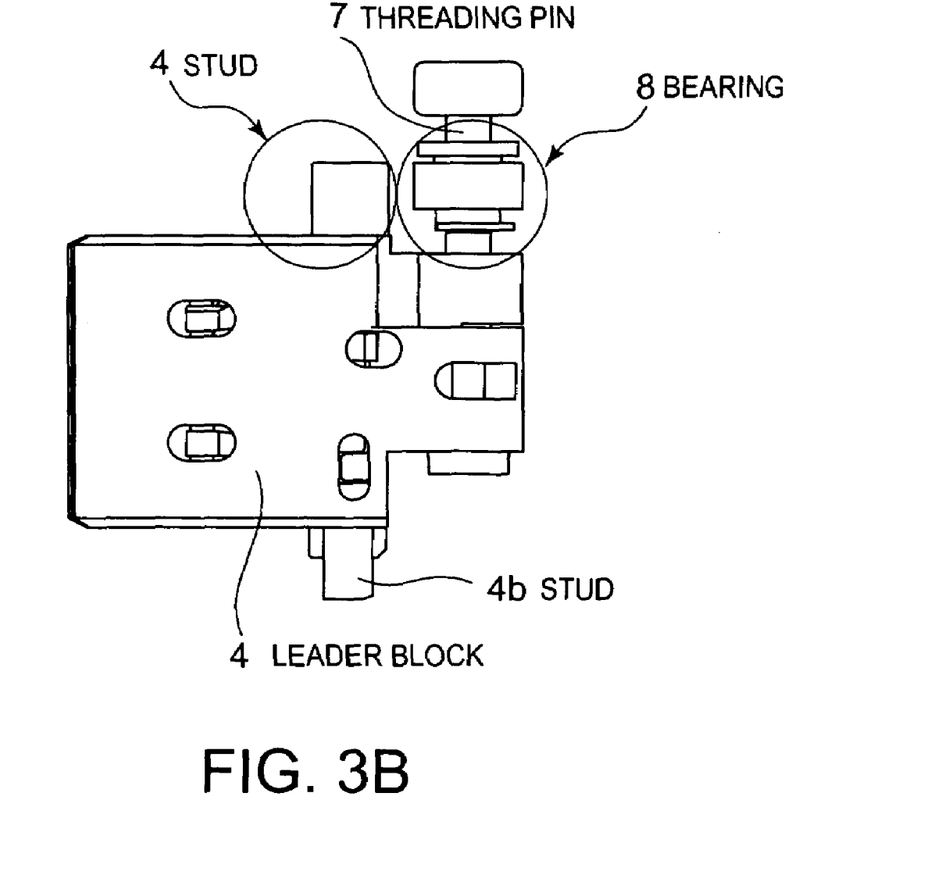
FIG. 3B shows an exemplary frontal view of the exemplary leader block.

The threading pin 7 shown in FIGS. 3A and 3B is clamped to the tip of the threading arm (equivalent to a component shown by reference numeral 9 in JP-A No. 135003/2001) not shown in the drawing. The edge of leader block 4 is axially supported for free movement at the lower edge of threading pin 7.

For example, second contact unit 4a (e.g., stud 4a) may be formed on the upper surface of leader block 4. For example, first contact unit 8 (e.g., bearing 8) may be inserted at a position at the same height as stud 4a, at a section protruding from the upper surface of leader block 4 at threading pin 7. In other words, first contact unit 8 (e.g., bearing 8) and second contact unit 4a (e.g., stud 4a) are co-planar and the co-planarity is substantially perpendicular to a rotation axis of rotational shaft (e.g., threading pin 106). In other words, the co-planarity is substantially parallel to a direction of a movement of leader block 107. An outer diameter of stud 4a may be smaller than that of bearing 8.

For example, bearing 8 may be inserted and positioned along with stud 4a in slot 5a functioning as guide section 1. As such, bearing 8 is guided along slot 5a during movement of threading pin 7 by the threading arm, and makes sliding contact with the side surfaces of slot 5a. Leader block 4 moves along slot 5a. For example, even if leader block 4 moves centering around threading pin 7 at this time, stud 4a is installed in slot 5a so that stud 4a strikes the side surfaces of slot 5a, and leader block 4's movement is axially centered around threading pin 7 and is kept within a specified range. The direction that leader block 4 faces may be therefore stably restricted during leader block 4's movement along slot 5a.

Stud 4a and bearing 8 are external to the leader block 4. For example, stud 4a and bearing 8 may be above leader block 4. For example, this may be because leader block 4 which is somewhat rigid and straight may not go into winding slot 5a, since the width of slot 5a is substantially the same as that of leader block 4. Therefore, for example, in this exemplary embodiment, the width of stud 4a and bearing 8 may be smaller that that of leader block 4. As a result, it may enable slot 5a to be thinner (i.e., have a reduced thickness).

In addition, as discussed below, this may be because sometimes it is necessary to shift leader block 4 to outside of the device, without going along slot 5a. In this case, for example, a part of leader block 4 is positioned under cam plate 5. As a result, it may enable slot 5a to be thinner.

Figure 4:
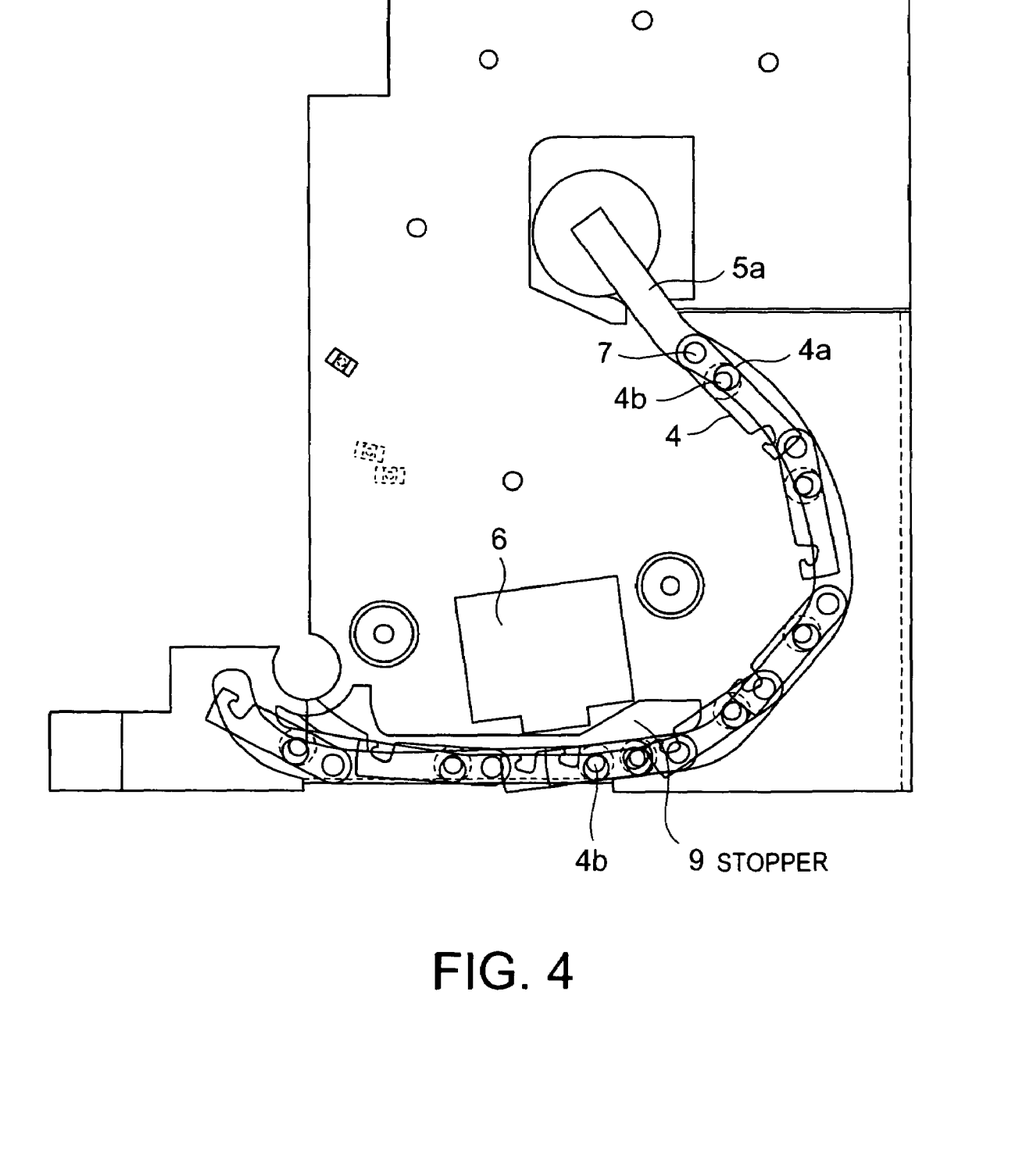
FIG. 4 shows an exemplary upper view showing the overall exemplary device with the exemplary leader block track along the exemplary slot shown in FIG. 2.

FIG. 4 shows the exemplary track that guides leader block 4 along slot 5a. As FIG. 4 shows exemplarily, threading pin 7 pulls leader block 4 so it moves along slot 5a, and stud 4a also moves along slot 5a so that leader block 4 may be restricted within a specified movement range axially centered-on threading pin 7.

For example, the position of stud 4a may deviate to the device's outer side with respect to the center line X taken by threading pin 7 on leader block 4, as shown in FIG. 3(*a*) and FIG. 4. Therefore, leader block 4 has substantially no free movement towards the device's outer side. However, a comparatively large degree of freedom occurs towards the device's inner side. For example, this degree of movement freedom may stabilize the tape guiding operation of magnetic tape drawn out from storage medium 11 (e.g., tape cartridge) by leader block 4, along the tape guide roller (not shown in the drawings) on the device's inner side. Also, for example, this may prevent leader block 4 from interfering with the cover on the device is outer side and the cleaning mechanism, etc.

In this exemplary embodiment, the movement freedom of leader block 4 is therefore towards the inner side of the device, as described above. For example, stopper 9 may be installed on the bottom surface in front of magnetic head 6 so that leader block 4 will not interfere with magnetic head 6 while being guided. For example, stud 4b may be installed on the bottom surface of leader block 4, and may make direct contact with the side surface of stopper 9, thereby to prevent leader block 4 from moving towards the magnetic head 6 side.

When leader block 4 is inserted in the magnetic tape entrance/exit 2 of storage medium 11 (e.g., tape cartridge) loaded in the device (e.g., a first portion (position) near storage medium 11 (e.g., tape cartridge), e.g., a start point of leader block position in this state), for example, leader block 4 should be released (e.g., move freely) with respect to threading pin 7 in order that leader block 4 can grip or release the lead pin on the magnetic tape tip within storage medium 11 (e.g., tape cartridge).

Also, when leader block 4 is inserted in the center section of the machine reel within the device (e.g., a second portion (position) near center section 3 of the machine reel, e.g., an end point of leader block position in this state), for example, leader block 4 should be released (e.g., move freely) with respect to threading pin 7 in order that leader block 4 can move along with the machine reel.

Therefore, except for a third portion 5d (e.g., an intermediate position) between the first portion (position) and the second portion (position), by changing the shape of cam plate 5 just at the first portion (position) (e.g., the start point) and the second portion (position) (e.g., the end point), the side surface positions of slot 5a may be made higher than stud 4a, for example. Further, stud 4a on the upper surface of leader block 4 axially supported for free movement in threading pin 7, may not interfere with the side surface of slot 5a.

Figures 5A, 5B, 5C, 5D:
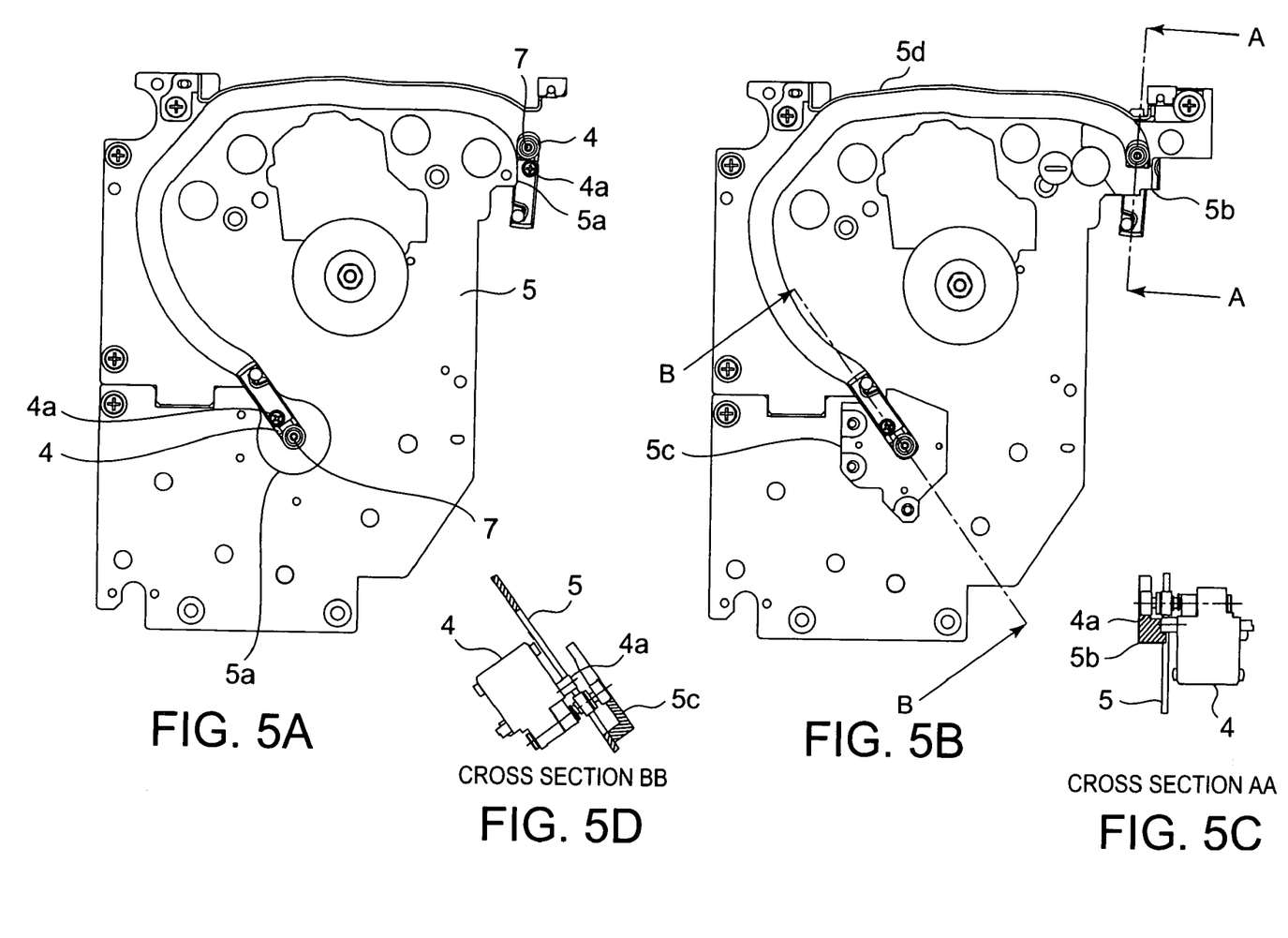
FIGS. 5A-5D show exemplary cross-sectional views of the exemplary first portion (e.g., position) (cross-section AA) and the exemplary second portion (e.g., position) (cross-section BB)

FIGS. 5A-5D show exemplary cross-sectional views of the exemplary first portion (position) (cross-section AA) and the exemplary second portion (position) (cross-section BB). In the cross-section AA, as shown in FIG. 5C, slot 5a is formed away from stud 4a, and stud 4a does not interfere with the side surface of slot 5a. Upper guide 5b is attached to cain plate 5 such that upper guide 5b is higher than stud 4a. Stud 4a on the upper surface of leader block 4 is axially supported for free movement in threading pin 7, and may not interfere with the side surface of slot 5b.

In the cross section BB as shown in FIG. 5D, slot 5a is formed away from stud 4a, and stud 4a does not interfere with the side surface of slot 5a. Upper guide 5c is attached to cam plate 5 such that upper guide 5c is higher than stud 4a. Stud 4a on the upper surface of leader block 4 is axially supported for free movement in threading pin 7, and nay not interfere with the side surface of slot 5c.

In the exemplary embodiment of this invention described above, by making the height of bearing 8 installed on threading pin 7, the same height as stud 4a (e.g., bearing 8 and stud 4 are co-planar) that restricts how leader block 4 faces, leader block 4 may be guided from the vicinity of tape entrance/exit 2 of storage medium 11 (e.g., tape cartridge) loaded within the device to center section 3 of the machine reel and the direction that leader block 4 faces may be restricted, with just one guide section 1.

In other words, in this exemplary embodiment of the magnetic tape device 10 as an example of a storage medium leader mechanism (wound film medium, e.g., magnetic tape device, a web, etc.), the magnetic tape device 10 may be made thinner along its height (i.e., its thickness direction) compared to the case (FIGS. 6-10B) when two guide sections are utilized to perform both the function of guiding leader block 4 to center section 3 of the machine reel, and the function of restricting how the leader block 4 faces.

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or embodiments as fall within the true scope of the invention.

For example, while a tape mechanism has been described above in the exemplary embodiment, the invention would be equally applicable to any mechanism using a wound material to be a threaded onto another mechanism (e.g., reel).

Further, the inventor's intent is to encompass all equivalents of all the elements of the claimed invention even if the claims are amended during prosecution.

This application is based on Japanese Patent Application No. 2005-139658 filed on May 12, 2005 and including specification, claims, drawings and summary. The disclosure of the above Japanese Patent Application is incorporated herein by reference in its entirety.

What is claimed is:

1. A storage medium leader mechanism for threading a film of a storage medium on a machine reel in a storage medium apparatus along a guide, comprising:
   a rotational shaft;
   a leader block that picks up said film, said leader block being rotatably connected with said rotational shaft, wherein said leader block includes:
      a first contact unit that is contactable with said guide that guides said leader block; and
      a second contact unit that is contactable with said guide, wherein said first and second contact units are co-planar, a co-planarity of said first and second contact units being substantially perpendicular to a rotation axis of said rotational shaft.

2. The storage medium leader mechanism according to claim 1, wherein said co-planarity is substantially parallel to a direction of a movement of said leader block.

3. The storage medium leader mechanism according to claim 1, wherein said rotational shaft includes a threading pin.

4. The storage medium leader mechanism according to claim 1, wherein said first contact unit is external to said leader block.

5. The storage medium leader mechanism according to claim 1, wherein said first contact unit includes a bearing, said rotational shaft being inserted into said bearing.

6. The storage medium leader mechanism according to claim 1, wherein said second contact unit includes a stud that is external to said leader block.

7. The storage medium leader mechanism according to claim 6, wherein a width of said stud is smaller than that of said leader block.

8. Tile storage medium leader mechanism according to claim 7, wherein said stud is deviated to the storage medium leader apparatus outer side with respect to a center line taken by said rotational shaft on said leader block.

9. A storage medium leader apparatus, comprising:
   said storage medium leader mechanism in claim 1; and
   said guide guiding said leader block, said guide being a single guide.

10. The storage medium leader apparatus according to claim 9, wherein said single guide includes a slot, said first and second contact units being insertable in said slot.

11. The storage medium leader apparatus according to claim 9, further comprising:
    a read head that reads data in said storage medium; and
    a stopper that prevents said leader block from interfering with said read head.

12. The storage medium leader apparatus according to claim 10, further comprising:
    said machine reel,
    wherein said single guide includes:
       a first portion near said storage medium;
       a second portion near said machine reel; and
       a third portion between said first and second portions,
    wherein said first and second contact units are releasable from said single guide at said first and second portions.

13. The storage medium leader apparatus according to claim 12, wherein the side surface of said slot is higher than that of said first and second contact units at one of said first and second portions.

14. A storage medium leader mechanism for threading a film of a storage medium on a machine reel in a storage medium apparatus along a guide, comprising:
    means for picking up said film;
    means for rotating said means for picking up means, said picking up means being rotatably connected with said rotating means; and
    wherein said picking up means includes:
       first means for contacting a single guide that guides said picking up means; and
       second means for contacting said single guide, wherein said first and second contacting means are co-planar, a co-planarity of said first and second contacting means being substantially perpendicular to a rotation axis of said rotating means.

15. A method of forming a storage medium leader mechanism for threading a film of a storage medium on a machine reel in a storage medium apparatus along a guide, comprising:
    providing a rotational shaft;
    providing a leader block that picks up said film, said leader block being rotatably connected with said rotational shaft;
    providing a first contact unit that is contactable with said guide that guides said leader block; and
    providing a second contact unit that is contactable with said guide with said leader block,
    said first and second contact units being co-planar, a co-planarity of said first and second contact units being substantially perpendicular to a rotation axis of said rotational shaft.

16. A web storage device, comprising:
    a rotational shaft;
    a leader block that picks up said web, said leader block being rotatably connected with said rotational shaft; and a single guide that guides said leader block,
wherein said leader block includes:
a first contact unit that is contactable with said single guide that guides said leader block; and
a second contact unit that is contactable with said single guide.

17. The web storage device according to claim 16, wherein said first and second contact units are co-planar, a co-planarity of said first and second contact units being substantially perpendicular to a rotation axis of said rotational shaft.

18. The web storage device according to claim 16, wherein said web comprises a tape.

* * * * *